(12) United States Patent
Yue

(10) Patent No.: US 9,039,066 B1
(45) Date of Patent: May 26, 2015

(54) FOLDABLE TONNEAU COVER FOR PICK-UP TRUCK AND WATERPROOF FLEXIBLE STRIP THEREOF

(71) Applicant: CYC ENGINEERING, INC., Fremont, CA (US)

(72) Inventor: Shiawdar shaun Yue, Cupertino, CA (US)

(73) Assignee: CYC ENGINEERING, INC., Fremont, CA (US)

( * ) Notice: Subject to any disclaimer, the term of this patent is extended or adjusted under 35 U.S.C. 154(b) by 0 days.

(21) Appl. No.: 14/109,402

(22) Filed: Dec. 17, 2013

(51) Int. Cl.
*B60P 7/02* (2006.01)

(52) U.S. Cl.
CPC .......................................... *B60P 7/02* (2013.01)

(58) Field of Classification Search
CPC .............. G02C 1/06; G02C 5/00; G02C 1/04; B60J 7/141; B60J 7/102; B60J 7/104; B60J 11/00; B01D 35/147; B60P 7/04; Y10S 135/907
USPC ............. 296/100.09, 100.04, 100.07, 100.01, 296/100.02, 100.06, 100.08
See application file for complete search history.

(56) References Cited

U.S. PATENT DOCUMENTS

| | | | | |
|---|---|---|---|---|
| 4,861,092 A * | 8/1989 | Bogard | ..................... | 296/100.09 |
| 5,427,428 A * | 6/1995 | Ericson et al. | .................. | 296/98 |
| 5,636,893 A * | 6/1997 | Wheatley et al. | ........ | 296/100.07 |
| 5,857,729 A * | 1/1999 | Bogard | ..................... | 296/100.09 |
| 5,934,735 A * | 8/1999 | Wheatley | .................. | 296/100.01 |
| 6,082,806 A * | 7/2000 | Bogard | ..................... | 296/100.06 |
| 2004/0195857 A1* | 10/2004 | Chverchko et al. | ...... | 296/100.07 |
| 2007/0035151 A1* | 2/2007 | Rusu | ......................... | 296/100.01 |
| 2007/0210608 A1* | 9/2007 | Klein | ....................... | 296/100.02 |
| 2008/0100088 A1* | 5/2008 | Calder et al. | ............. | 296/100.09 |
| 2010/0133872 A1* | 6/2010 | Kosinski | .................. | 296/100.09 |
| 2012/0274092 A1* | 11/2012 | Yue | .......................... | 296/100.07 |
| 2013/0114997 A1* | 5/2013 | Yue | ............................... | 403/205 |
| 2013/0341960 A1* | 12/2013 | Garska | ..................... | 296/100.18 |

* cited by examiner

*Primary Examiner* — Kiran B Patel
(74) *Attorney, Agent, or Firm* — Lowe Hauptman & Ham, LLP

(57) ABSTRACT

A foldable tonneau cover is disclosed and has two frame sections and at least one hidden-type hinge. Two frame members of two adjacent frame sections are correspondingly formed with two embedded holes. The hidden-type hinge is pivotally connected between the adjacent frame members. When the frame sections are horizontally extended relative to each other, the hidden-type hinge is substantially received in the embedded holes. When the frame sections are rotated or folded relative to each other, the hidden-type hinge is partially exposed out of the embedded holes. Thus, the occupied space of the hidden-type hinge and the gap between the adjacent frame sections can be minimized. The waterproof flexible strip can be continuously extended along the entire length of the two adjacent frame members without being interfered with by the hidden-type hinge substantially hidden within frame members, so as to enhance the waterproof reliability thereof.

6 Claims, 14 Drawing Sheets

FOLDABLE TONNEAU COVER FOR PICK-UP TRUCK AND WATERPROOF FLEXIBLE STRIP THEREOF

FIELD OF THE INVENTION

The present invention relates to a foldable tonneau cover and a waterproof seal thereof, and more particularly to a foldable tonneau cover for a pick-up truck having a waterproof flexible strip.

BACKGROUND OF THE INVENTION

A traditional pick-up truck has a cargo box used to carry various cargo. Generally, the cargo box is covered by a tonneau cover which is releasably clamped to and extended above the cargo box, so as to protect the carried cargo from adverse weather and improve the aesthetic appearance of the pick-up truck. Tonneau covers can be classified into hard-top type and soft-top type, wherein the hard-top type tonneau cover has a hard top made of rigid material, such as metal, fiberglass or the like, while the soft-top type tonneau cover has a soft top made of flexible material, such as canvas, vinyl plastic or a weather-resistant fabric. Moreover, the tonneau cover can be designed to provide a foldable function to help a user to conveniently extend or store the tonneau cover.

Referring now to FIGS. 1, 2 and 3, schematic views of a traditional foldable tonneau cover system for a pick-up truck are illustrated, wherein a tonneau cover system 10 is used to cover a cargo box 21 of a pick-up truck 20, and the tonneau cover system 10 comprises a plurality of frame sections 11, 12, 13, a plurality of hinges 14, a plurality of clamps (not-shown) and at least one cover portion 15. The number of the cover portion 15 can be one or corresponding to that of the frame sections 11-13 (such as three). The cover portion 15 is made of flexible or rigid material, and can be suitably fixed on the corresponding frame sections 11-13. Each of the frame sections 11 is constructed by a plurality of frame members. One of the frame sections 11, 13 can be pivotally connected to another adjacent frame section 12 through two or more of the hinges 14, so that all of the frame sections 11-13 can be adjusted to an extended position or a storage position.

When the frame sections 11 are in the extended position as shown in FIG. 2, the frame sections 11-13 are horizontally extended on two side walls 22 and a tailgate 23 of the cargo box 21, and fixed thereon by the clamps, so as to cover an inner space of the cargo box 21. When the frame sections 11-13 are in the storage position as shown in FIG. 3, the frame sections 11-13 are folded and stacked on a front end of the two side walls 22, so as to expose the inner space of the cargo box 21 for placing or taking cargo.

In the tonneau cover system 10, each of the hinges 14 mainly comprises two hinge portions and a pivot axis, wherein each of the hinge portions is installed on frame members of one of the frame sections 11-13, while the pivot axis is pivotally connected between the two hinge portions. In order to prevent water leakage from the gap between any two adjacent frame sections 11-13, side surfaces of the frame members of the two adjacent frame sections 11-13 are provided with a pair of laterally-extending channels (unlabeled), wherein a sealing strip 16 is disposed in each of the laterally-extending channels, respectively. Thus, when the frame sections 11 are in the extended position as shown in FIG. 2, the two sealing strips 16 can be abutted against each other to provide a waterproof function for the frame sections 11-13. Furthermore, the external (or internal) side of each of the hinges 14 can be covered with another seal sheet (not-shown) to further enhance the waterproof function for the frame sections 11-13.

However, in a first case that a large-area elongated piece of the seal sheet is covered on the external side of the hinge 14, when the two adjacent frame sections 11-12 are folded and stacked with each other, it is easy to irregularly twist the seal sheet between two outer surfaces of the two adjacent frame members, and thus the ideal folding angle (i.e. 180 degree) between the two adjacent frame sections 11-12 may not be carried out due to the jam of the seal sheet. On the other hand, in a second case that a small-area elongated piece of the seal sheet is covered on the internal side of the hinge 14, when the two adjacent frame sections 11-12 are horizontally extended, it is still easy to irregularly twist the seal sheet between two side surfaces of the two adjacent frame members, and thus the ideal extension angle (i.e. 0 degree) between the two adjacent frame sections 11-12 may not be carried out due to the jam of the seal sheet; and when the two adjacent frame sections 11-12 are folded and stacked with each other, it is easy to generate a pull force between two outer surfaces of the two adjacent frame members because the curve length of the seal sheet may be insufficient, and thus the ideal folding angle (i.e. 180 degree) between the two adjacent frame sections 11-12 may not be carried out due to the insufficient curve length of the seal sheet.

Moreover, the pivot axis of the hinge 14 is installed at a fulcrum position between the two adjacent frame members, and thus occupies a certain space of the gap therebetween in the horizontally extended status. As a result, the pivot axis interfere with the installation and open/close operation of the seal sheet on the external or internal side of the hinge 14, so that it may increase the installation offset between the hinge 14, the seal sheet and the frame members. As a result, the installation yield may be affected, and the waterproof reliability thereof may be reduced.

As a result, it is necessary to provide a waterproof seal structure and a hinge structure for the foldable tonneau cover to solve the problems existing in the conventional technology, as described above.

SUMMARY OF THE INVENTION

A primary object of the present invention is to provide a foldable tonneau cover for a pick-up truck and a waterproof flexible strip thereof, which is provided with a waterproof flexible strip continuously extended along the entire length of the two adjacent frame members without being interfered with by the hidden-type hinge substantially hidden within the frame members, so as to enhance the waterproof reliability thereof.

A secondary object of the present invention is to provide a foldable tonneau cover for a pick-up truck and a waterproof flexible strip thereof, which is provided with at least one hidden-type hinge substantially hidden within two opposite side surfaces of frame members of two adjacent frame sections in a horizontally extended status, so as to minimize the occupied space of the hidden-type hinge and the gap between the adjacent frame sections.

A third object of the present invention is to provide a foldable tonneau cover for a pick-up truck and a waterproof flexible strip thereof, which is provided with at least one hidden-type hinge and a waterproof flexible strip between any two adjacent frame sections, so as to simplify the waterproof interconnection structure between the adjacent frame sections.

A fourth object of the present invention is to provide a foldable tonneau cover for a pick-up truck and a waterproof flexible strip thereof, which is provided with a foam core between two rigid cover plates of each frame section, so as to enhance the structural strength and waterproof reliability of the frame section.

To achieve the above object, the present invention provides a foldable tonneau cover of a pick-up truck, which comprises:

a first frame section having a plurality of first frame members;

a second frame section having a plurality of second frame members, wherein the adjacent first and second frame members of the first and second frame sections have two opposite side surfaces;

at least one hidden-type hinge pivotally connected between the opposite side surfaces of the adjacent first and second frame members; and a waterproof flexible strip flexibly connected between the adjacent frame members, disposed outside the hidden-type hinge, and having at least two rigid edge rims continuously connected to and extended along the entire length of the adjacent first and second frame members, and a flexible sheet integrally and flexibly connected between the at least two rigid edge rims.

In one embodiment of the present invention, the at least two rigid edge rims are made of a first plastic material, the flexible sheet is made of a second plastic material, and the first plastic material has a stiffness greater than that of the flexible sheet.

In one embodiment of the present invention, the two opposite side surfaces of the adjacent first and second frame members have a first C-shape insertion groove and a second C-shape insertion groove, respectively, and two of the rigid edge rims of the waterproof flexible strip are inserted into the first and second C-shape insertion grooves, respectively.

In one embodiment of the present invention, the at least two rigid edge rims have a cross-sectional height greater than that of the flexible sheet, so that a water collection recess is defined by the at least two rigid edge rims and the flexible sheet, wherein the water collection recess faces an outer side of a gap defined between the adjacent first and second frame members in a horizontally extended status of the adjacent first and second frame members.

In one embodiment of the present invention, an outer surface of the first frame member has at least one first C-shape insertion groove, an outer surface of the second frame member has at least one second C-shape insertion groove, and the at least two rigid edge rims of the waterproof flexible strip are inserted into the first and second C-shape insertion grooves, respectively.

In one embodiment of the present invention, the outer surface of the first frame member has two of the first C-shape insertion grooves, the outer surface of the second frame member has two of the second C-shape insertion grooves, and four of the rigid edge rims of the waterproof flexible strip are inserted into the two first C-shape insertion grooves and the two second C-shape insertion grooves, respectively.

In one embodiment of the present invention, the first frame section has two rigid cover plates covering on the first frame members, and a foam core filled in a space defined between the two rigid cover plates and the first frame members.

In one embodiment of the present invention, the second frame section has two rigid cover plates covering on the second frame members, and a foam core filled in a space defined between the two rigid cover plates and the second frame members.

In one embodiment of the present invention, each of the first and second frame members is formed with an installation slot, a C-shaped insertion groove and a linear installation groove, wherein the foam core is filled into the C-shaped insertion groove, and an outer edge of one of the rigid cover plates is inserted into the linear installation groove.

In one embodiment of the present invention, at least one hole is formed between the C-shaped insertion groove and the installation slot, and the foam core is further filled into the installation slot through the hole.

Furthermore, the present invention provides another waterproof foldable tonneau cover for a pick-up truck, which comprises:

a first frame section having a plurality of first frame members;

a second frame section having a plurality of second frame members, wherein the adjacent first and second frame members of the first and second frame sections have two opposite side surfaces;

at least one hidden-type hinge pivotally connected between the adjacent first and second frame members; and a waterproof flexible strip flexibly connected between the adjacent frame members, disposed outside the hidden-type hinge, and having at least two rigid edge rims continuously connected to and extended along the entire length of the adjacent first and second frame members, and a flexible sheet integrally and flexibly connected between the at least two rigid edge rims, wherein a water collection recess is defined by the at least two rigid edge rims and the flexible sheet.

Moreover, the present invention provides a waterproof flexible strip for a foldable tonneau cover for a pick-up truck, the foldable tonneau cover including a first frame section having a plurality of first frame members, a second frame section having a plurality of second frame members, and at least one hidden-type hinge pivotally connected between two opposite side surfaces of the adjacent first and second frame members, the waterproof flexible strip flexibly connected between the adjacent frame members, disposed outside the hidden-type hinge, and comprising:

at least two rigid edge rims continuously connected to and extended along the entire length of the adjacent first and second frame members; and a flexible sheet integrally and flexibly connected between the at least two rigid edge rims;

wherein the at least two rigid edge rims have a cross-sectional height greater than that of the flexible sheet, so that a water collection recess is defined by the at least two rigid edge rims and the flexible sheet, and wherein the water collection recess faces an outer side of a gap defined between the adjacent first and second frame members in a horizontally extended status of the adjacent first and second frame members.

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings. Furthermore, directional terms described by the present invention, such as upper, lower, front, back, left, right, inner, outer, side, longitudinal/vertical, transverse/horizontal, and etc., are only directions by referring to the accompanying drawings, and thus the used directional terms are used to describe and understand the present invention, but the present invention is not limited thereto.

Figure 1:
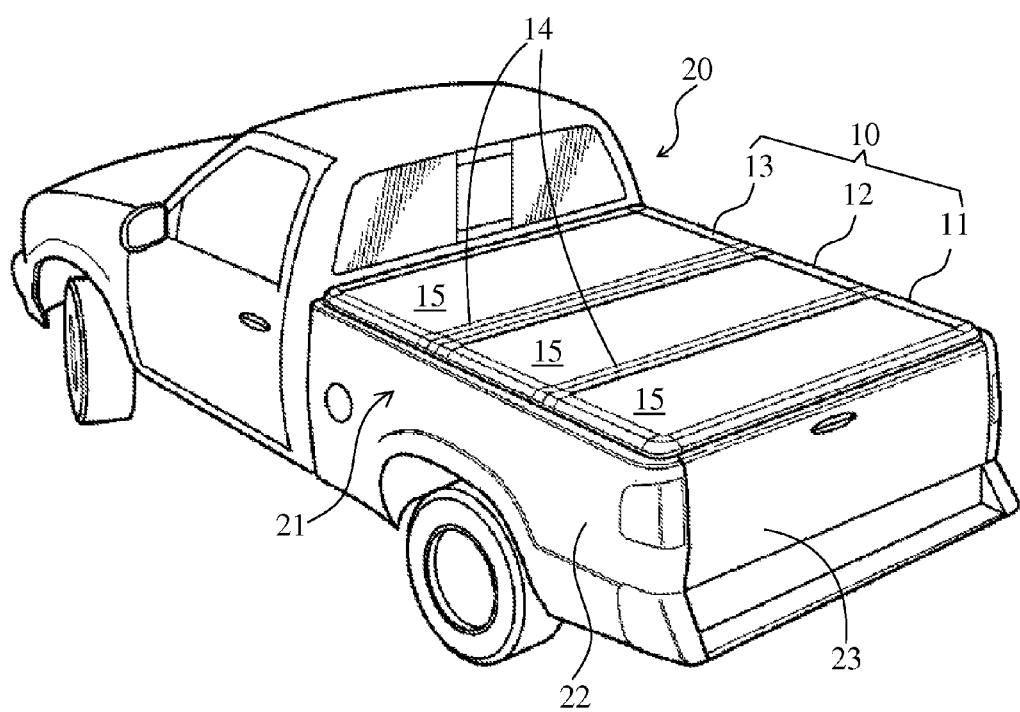
FIG. 1 is a perspective view of a traditional foldable tonneau cover system of a pick-up truck.
Figure 2:
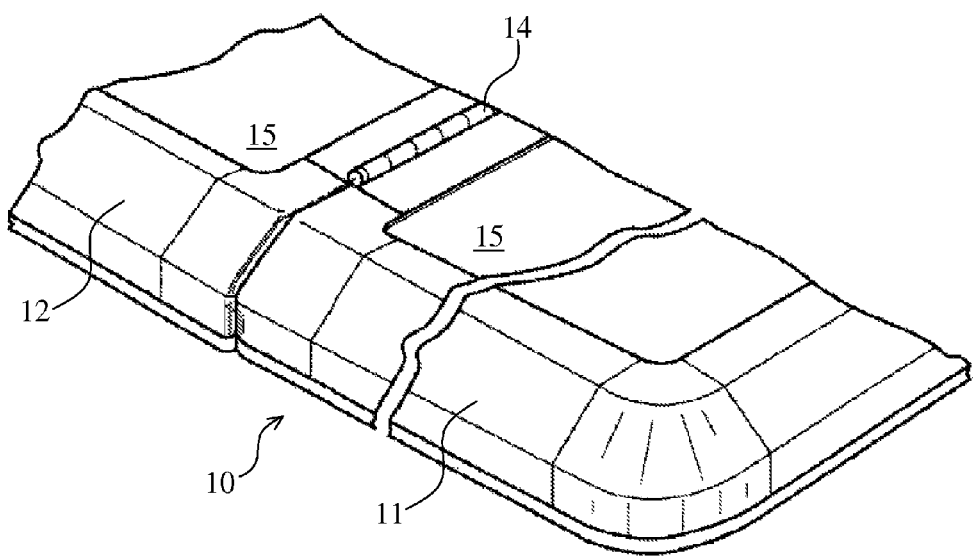
FIG. 2 is a partially enlarged view of the traditional foldable tonneau cover system of FIG. 1 in a horizontally extended status.
Figure 3:
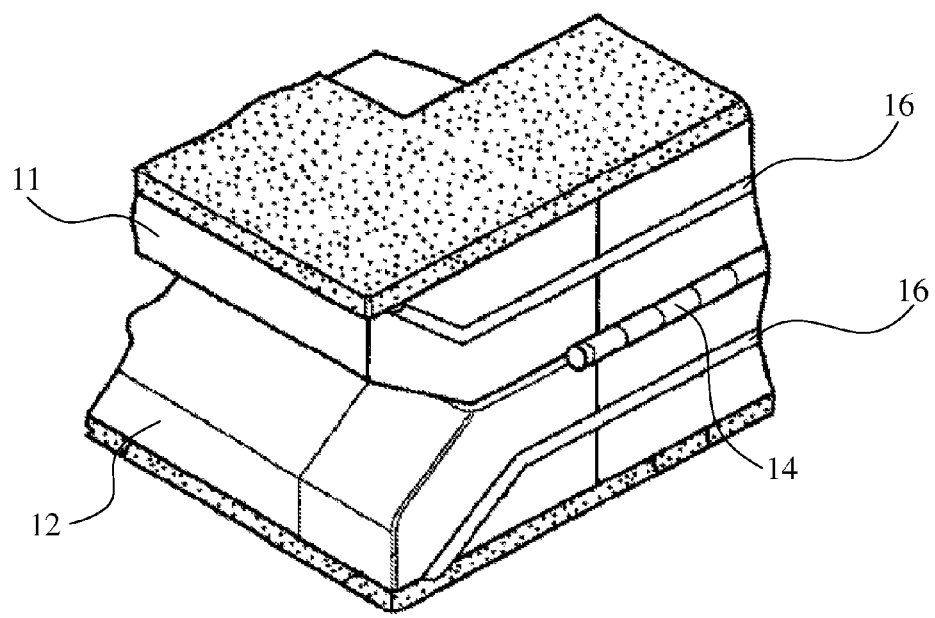
FIG. 3 is a partially enlarged view of the traditional foldable tonneau cover system of FIG. 1 in a folded status.
Figure 4:
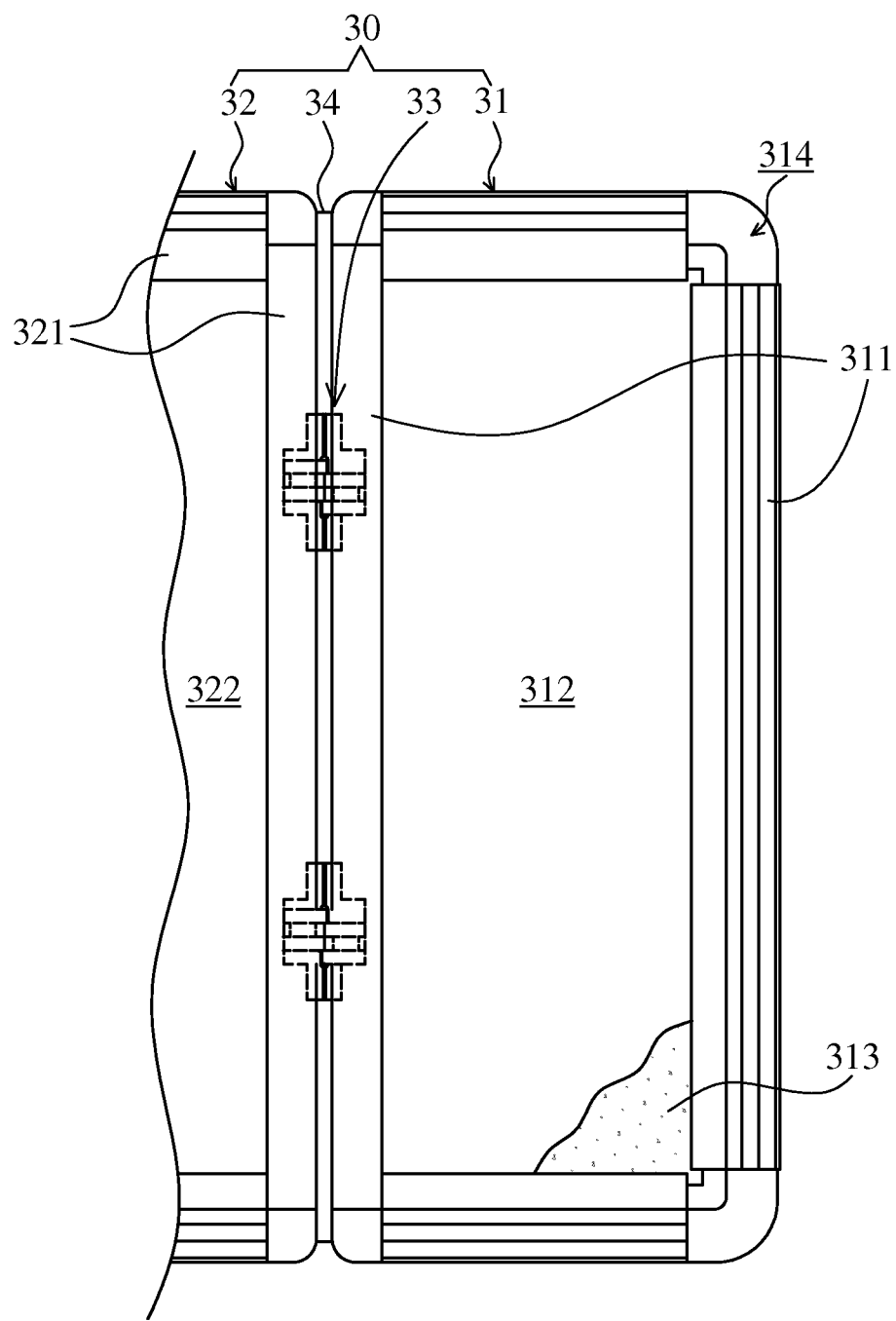
FIG. 4 is a partially top view of a foldable tonneau cover of a pick-up truck according to a first embodiment of the present invention.
Figure 5:
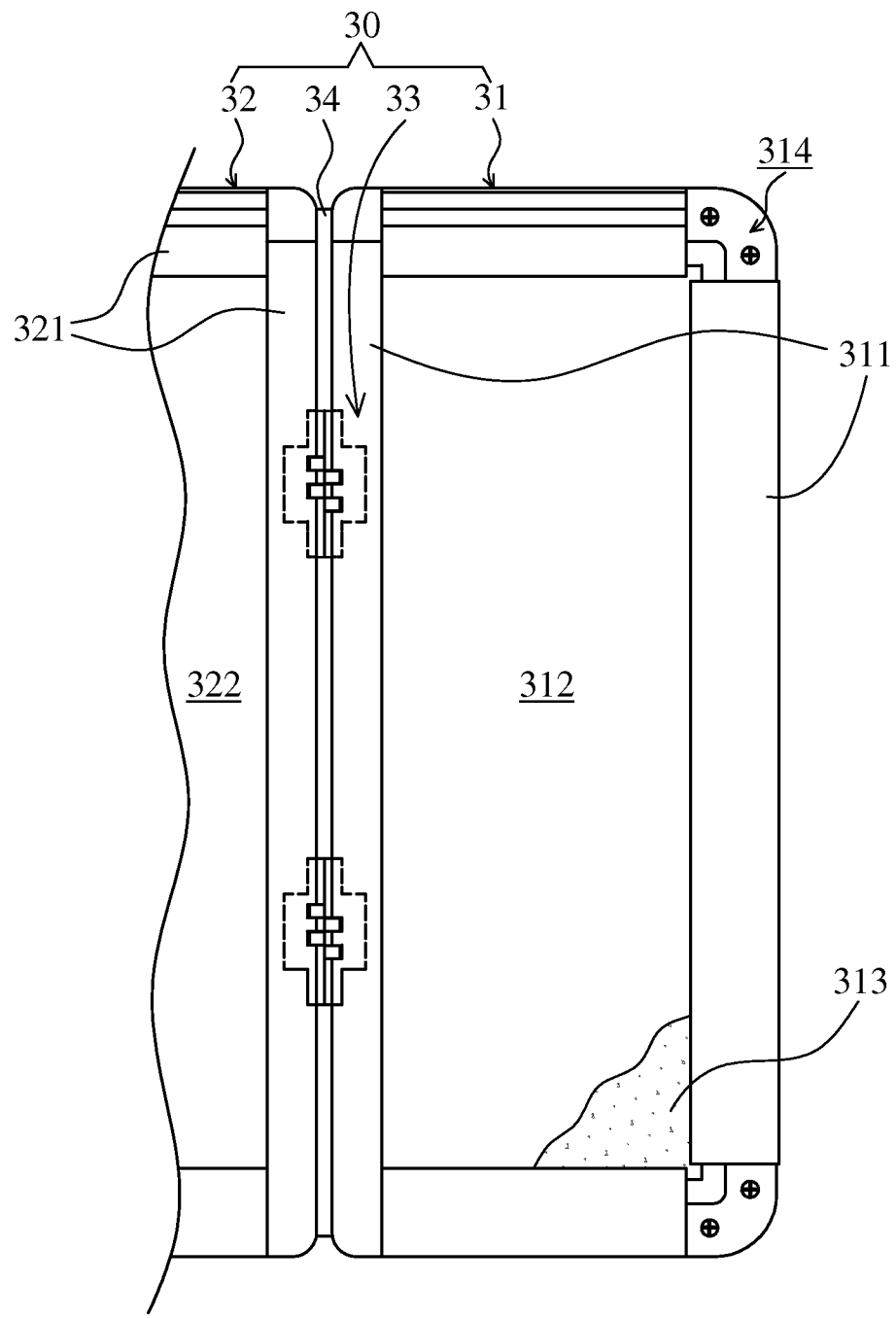
FIG. 5 is a partially bottom view of the foldable tonneau cover according to the first embodiment of the present invention.

Referring now to FIGS. 4 and 5, partially top and bottom views of a foldable tonneau cover of a pick-up truck according to a first embodiment of the present invention are illustrated. As shown, the foldable tonneau cover designated by numeral 30 is applied to a pick-up truck (as shown in FIG. 1) and comprises at least two frame sections 31,32, at least one hidden-type hinge 33 and at least one waterproof flexible strip 34, all of which will be described in more detailed hereinafter.

Figure 4A:
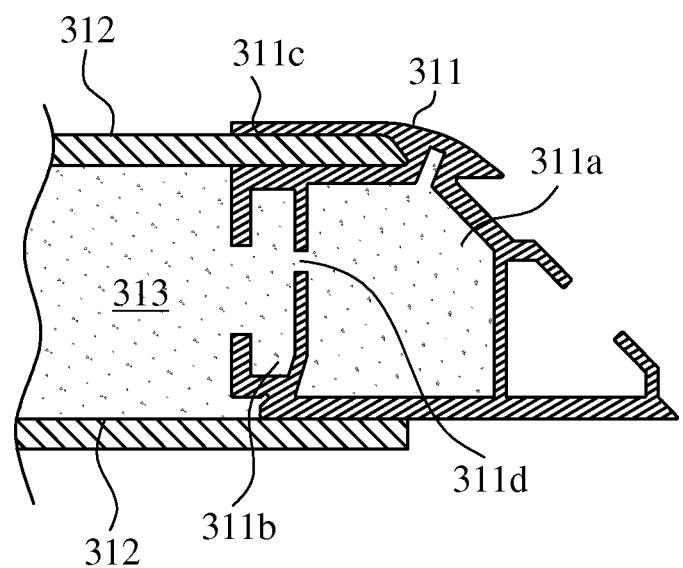
FIG. 4A is a partially enlarged cross-sectional view of a frame section having two rigid cover plates and a foam core according to the first embodiment of the present invention.

Referring to FIGS. 4 and 4A, the number of the frame sections 31,32 can be two, three, four or more. In the embodiment, the foldable tonneau cover 30 is provided with a first frame section 31 and a second frame section 32, but not limited to include additional frame section or not. The first frame section 31 has a plurality of first frame members 311, two rigid cover plates 312 and a foam core 313. The number of the first frame members 311 can be four, and can be made of metal (such as aluminum, iron, stainless steel, copper or alloy thereof) or engineering plastic. Each set of the first frame members 311 can be used to construct a rectangular frame and define a rectangular space within the rectangular frame. The rigid cover plates 312 are made of rigid material, such as engineering plastic (such as polyamide 6 (PA6), polyamide 66 (PA66), polypropylene (PP), acrylonitrile-butadiene-styrene (ABS) copolymer, polycarbonate (PC) or polybutylene terephthalate (PBT), without limitation) or metal (such as aluminum, iron, stainless steel, copper or alloy thereof). Two of the rigid cover plates 312 can be suitably covered and fixed on a top side and a bottom side of the first frame members 311, and the size of the rigid cover plates 312 is slightly greater than that of the rectangular space defined by the first frame members 311.

Furthermore, referring to FIG. 4A, a cross-section of each of the first frame members 311 at the outer edge of the first frame section 31 is formed with an installation slot 311a, a C-shaped insertion groove 311b and a linear installation groove 311c, wherein the installation slot 311a is used to be installed with two corner members 314 (as shown in FIGS. 4 and 5); the C-shaped insertion groove 311b is formed at an internal side of the installation slot 311a, wherein the foam core 313 (such as urethane foam material) is filled into the C-shaped insertion groove 311b and the rectangular space defined between the first frame members 311 and the two rigid cover plates 312; the linear installation groove 311c is formed at a top side (and/or a bottom side) of the installation slot 311a, wherein an outer edge of one of the rigid cover plates 312 is inserted into the linear installation groove 311c; and the first frame members 311 can be further formed with at least one hole 311d formed between the C-shaped insertion groove 311b and the installation slot 311a, and the foam core 313 is thus further filled into the installation slot 311a through the hole 311d.

Therefore, when water enters the installation slot 311a from the gap between the first frame members 311 and the corner members 314, there is no space in the installation slot 311a to receive water, so that the water leakage and the noise caused by water in the installation slot 311a can be minimized and avoided. In addition, the foam core 313 is further filled into the C-shaped insertion groove 311b, so that a reliable connection strength can be provided between the first frame members 311 and the foam core 313 in the rectangular space defined by the first frame members 311 and the two rigid cover plates 312.

Referring to FIGS. 4, 4A and 5, similarly, the second frame section 32 also has a plurality of second frame members 321, two rigid cover plates 322 and a foam core 323, all of which have structures and functions substantially the same as the corresponding first frame members 311, the rigid cover plates 312 and the foam core 313, as described above, so that the detailed description thereof will be omitted herein.

Figure 6:
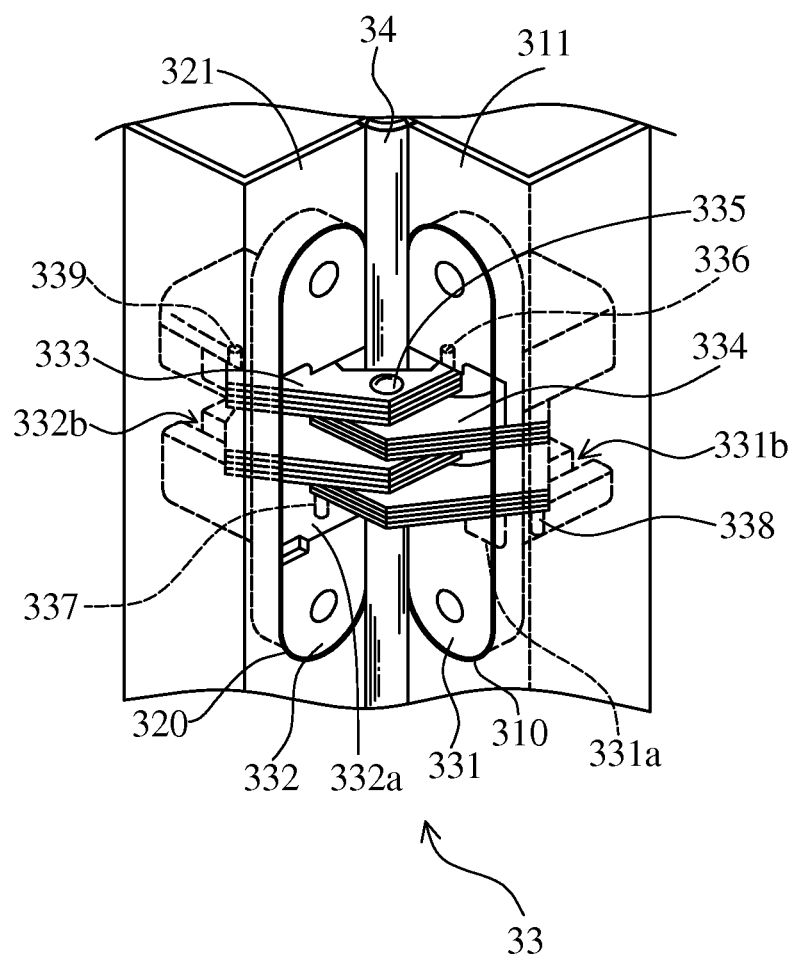
FIG. 6 is a partially enlarged view of the hidden-type hinge according to the first embodiment of the present invention in a partially folded status.
Figure 7:
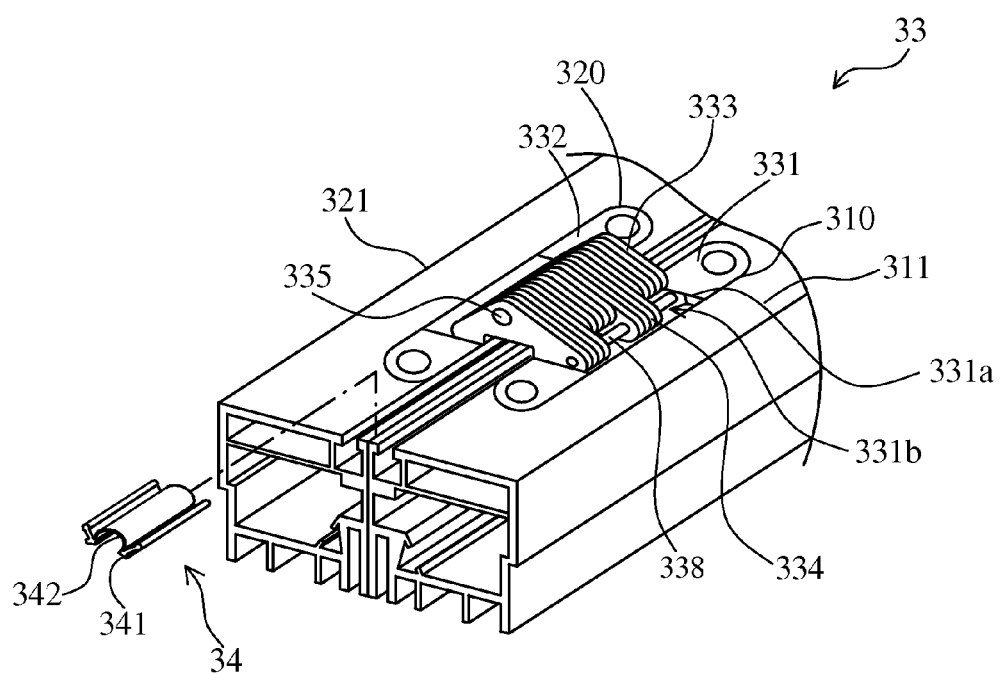
FIG. 7 is a partially enlarged and partially cross-sectional view of the hidden-type hinge according to the first embodiment of the present invention in a completely folded status, similar to FIG. 6.

Referring to FIGS. 6 and 7, a partially enlarged view of the hidden-type hinge 33 in a partially folded status and a partially enlarged and partially cross-sectional view of the hidden-type hinge 33 in a completely folded status are illustrated.

According to the foldable tonneau cover 30 of the present invention, one of the frame sections (e.g. the first frame section 31) can be pivotally connected to another adjacent frame section (e.g. the second frame section 32) through one, two or more of the hidden-type hinge 33, so that all of the two adjacent frame sections 31,32 can be pivotally rotated to an extended position or a storage position. When the two adjacent frame sections 31,32 are in the extended position, the frame sections 31,32 are horizontally extended on two side walls and a tailgate of a cargo box (as shown in FIG. 1), so as to cover an inner space of the cargo box. When the frame sections 31,32 are in the storage position, the frame sections 31,32 are folded and stacked on a front end of the two side walls, so as to expose the inner space of the cargo box.

In the embodiment, the adjacent first and second frame members 311,321 of the adjacent first and second frame sections 31,32 have structures different from that of the first and second frame members 311,321 at the outer edge of the first and second frame sections 31,32, wherein two opposite side surfaces of the adjacent first and second frame members 311,321 of the adjacent first and second frame sections 31,32 are correspondingly formed with a first/second embedded hole 310,320 and a first/second C-shape insertion groove 311e,321e, respectively, wherein the hidden-type hinge 33 is substantially received in the first and second embedded holes 310,320 when the first and second frame sections 31,32 are horizontally extended relative to each other; and the hidden-type hinge 33 is partially exposed out of the first and second embedded holes when the first and second frame sections 31,32 are rotated or folded relative to each other.

Figure 8:
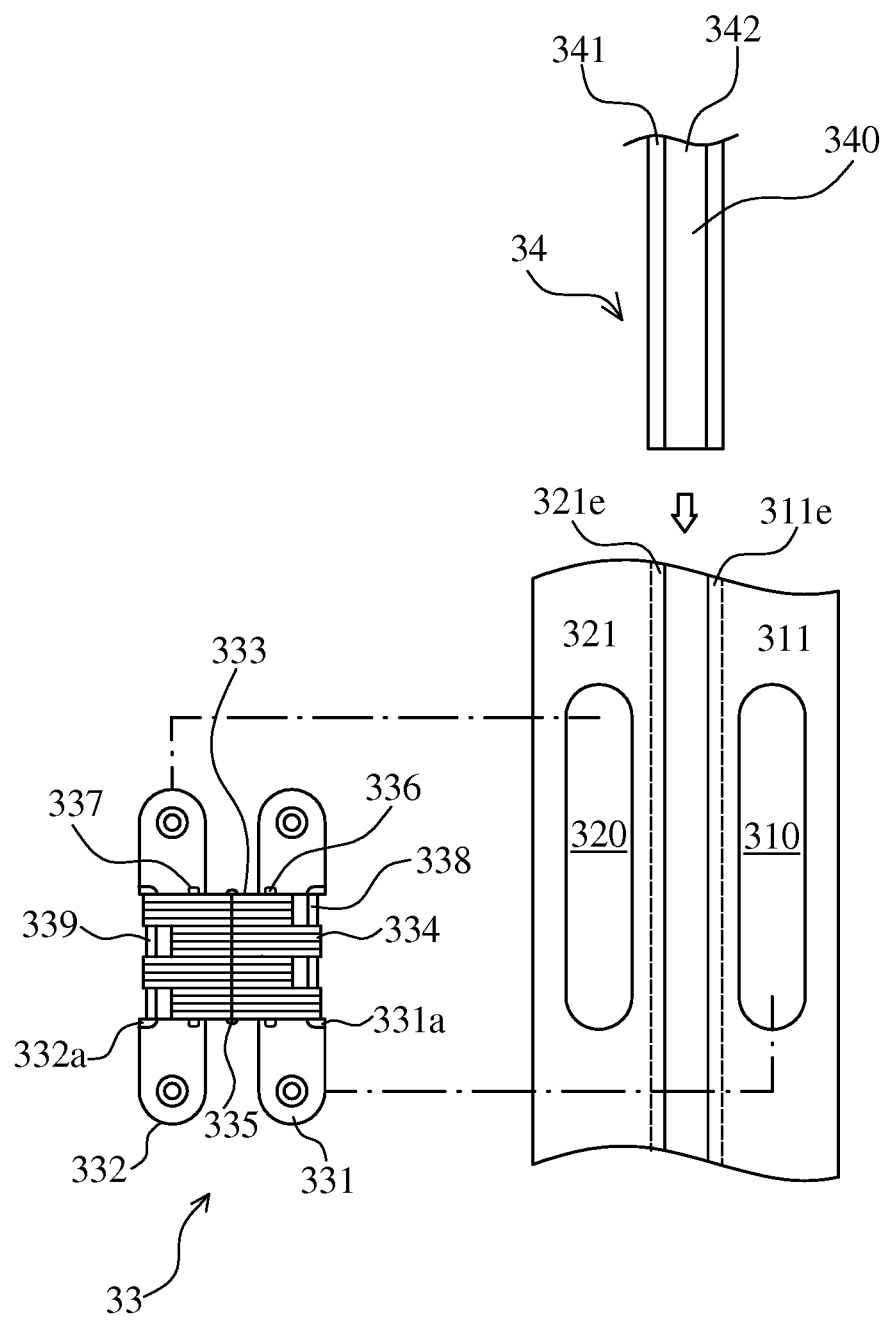
FIG. 8 is an exploded top view of the hidden-type hinge, a waterproof flexible strip and two adjacent frame members according to the first embodiment of the present invention.

For more details, referring now to FIG. 8, each of the hidden-type hinge 33 comprises: a first embedded body 331, a second embedded body 332, at least one first sliding member 333, at least one second sliding member 334, a central axis 335, a first pivotal shaft 336, a second pivotal shaft 337, a first sliding shaft 338 and a second sliding shaft 339, all of which are made of metal, such as stainless steel, aluminum, iron, copper or alloy thereof, without limitation.

Referring to FIGS. 6, 7 and 8, in the embodiment, the first embedded body 331 is substantially entirely (or mostly) embedded in the first embedded hole 310 of the first frame member 311; the second embedded body 332 is substantially entirely (or mostly) embedded in the second embedded hole 320 of the second frame member 321; the first sliding member 333 is pivotally connected to the first embedded body 331 by the first pivotal shaft 336 and slidably connected to the second embedded body 332 by the second sliding shaft 339; the second sliding member 334 is pivotally connected to the second embedded body 332 by the second pivotal shaft 337 and slidably connected to the first embedded body 331 by the first sliding shaft 338; and a central portion of the first and second sliding members 333,334 are commonly pivotally connected to the central axis 335. The hidden-type hinge 33 preferably has two of the first sliding members 333 and two of the second sliding members 334, both of which are alternately arranged with each other and rotatably connected with each other by the central axis 335.

As shown in FIGS. 5 and 6, the first and second embedded bodies 331,332 have a first receiving space 331a and a second receiving space 332a, respectively, to commonly receive the first and second sliding members 333,334. The first receiving space 331a of the first embedded body 331 has a pair of first pivotal holes (unlabeled) and the first pivotal shaft 336, the first pivotal shaft 336 has two ends fixed on the two first pivotal holes, and one end of the first sliding member 333 is pivotally connected to the first pivotal shaft 336. Similarly, the second receiving space 332a of the second embedded body 332 has a pair of second pivotal holes (unlabeled) and the second pivotal shaft 337, the second pivotal shaft 337 has two ends fixed on the two second pivotal holes, and one end of the second sliding member 334 is pivotally connected to the second pivotal shaft 337.

Furthermore, as shown in FIGS. 6 and 7, the first receiving space 331a of the first embedded body 331 has a pair of first sliding grooves 331b and the first sliding shaft 338, the first sliding shaft 338 has two ends slidably disposed in the two first sliding grooves 331b, and the other end of the second sliding member 334 is pivotally connected to the first sliding shaft 338. Similarly, the second receiving space 332a of the second embedded body 332 has a pair of second sliding grooves 332b and the second sliding shaft 339, the second sliding shaft 339 has two ends slidably disposed in the two second sliding grooves 332b, and the other end of the first sliding member 333 is pivotally connected to the second sliding shaft 339.

Referring back to FIGS. 4 and 5, when the first and second frame sections 31,32 are horizontally extended relative to each other (i.e. in an extended status), the first and second sliding members 333,334 are substantially entirely received in the first and second embedded bodies 331,332, wherein the first and second sliding members 333,334 are used to interconnect the first and second frame sections 31,32 with each other; and referring to FIGS. 6 and 7, when the first and second frame sections 31,32 are rotated or folded relative to each other (i.e. in a partially or completely folded status), the first and second sliding members 333,334 can partially slide out of the first and second embedded bodies 331,332, wherein the first and second sliding members 333,334 also can be used to interconnect the first and second frame sections 31,32 with each other.

Figure 9A:
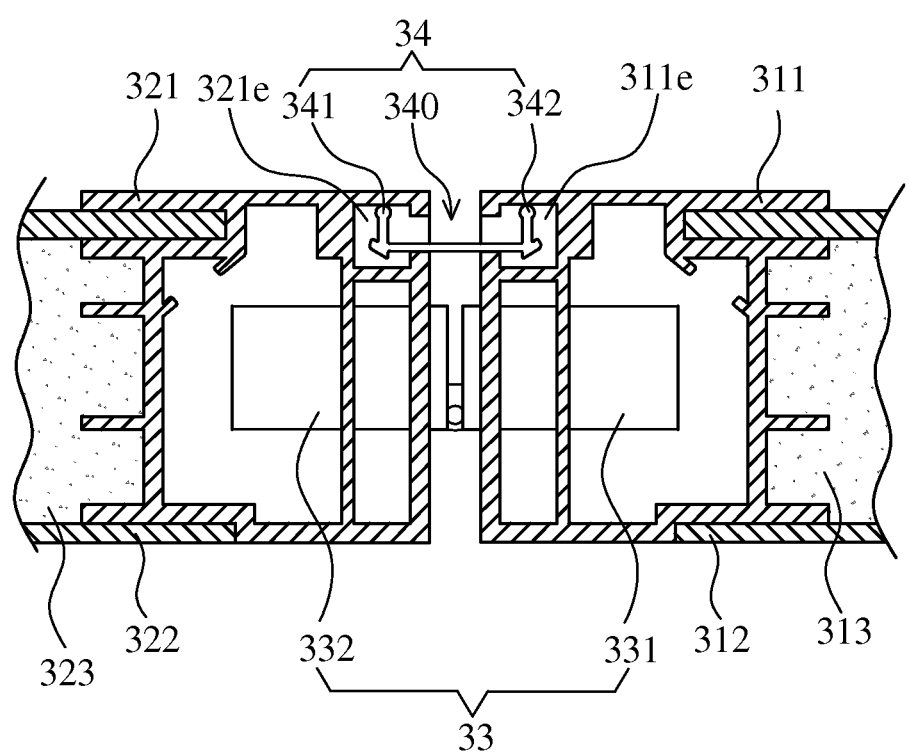
FIG. 9A is an assembled cross-sectional view of installing the waterproof flexible strip onto the two adjacent frame members according to the first embodiment of the present invention in the horizontally extended status.
Figure 9B:
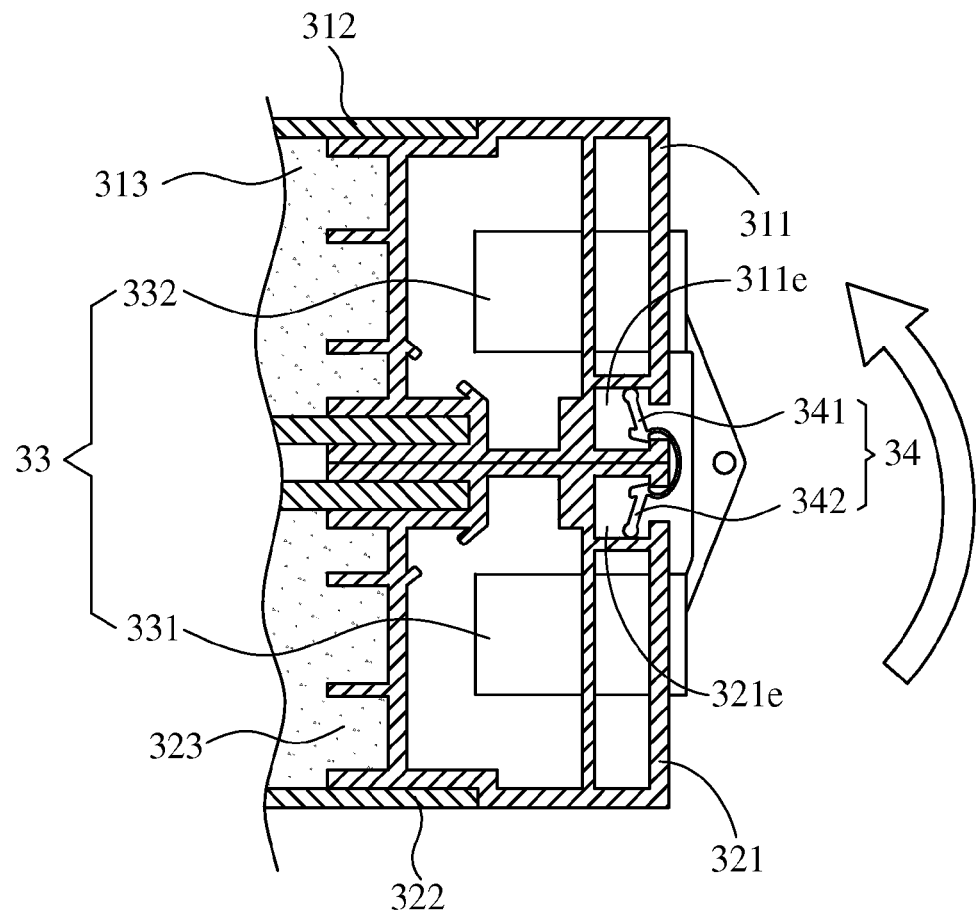
FIG. 9B is an assembled cross-sectional view of installing the waterproof flexible strip onto the two adjacent frame members according to the first embodiment of the present invention in the completely folded status.

Referring now to FIGS. 8 and 9A-9B, the foldable tonneau cover 30 further comprises a waterproof flexible strip 34 flexibly connected between the adjacent frame members 311, 321 and disposed outside/above the hidden-type hinge 33 (i.e. relatively close to the outer surface of the first and second frame members 311,321; or close to the ambient environment outside the first and second frame members 311,321), wherein the waterproof flexible strip 34 has two rigid edge rims 341 and a flexible sheet 342, the two rigid edge rims 341 are used to be continuously connected to and extended along the entire length of the adjacent first and second frame members 311,321; and the flexible sheet 342 is integrally and flexibly connected between the two rigid edge rims 341. In the embodiment, the two rigid edge rims 341 are made of a first plastic material, the flexible sheet 342 is made of a second plastic material, and the first plastic material preferably has a stiffness (rigidity) greater than that of the second plastic material.

Furthermore, in the horizontally extended status, the first C-shape insertion groove 311e and the second C-shape insertion groove 321e are formed at two opposite side surfaces of the adjacent first and second frame members 311,321, respectively, and the first C-shape insertion groove 311e is corresponding to second C-shape insertion groove 321e, wherein the two rigid edge rims 341 of the waterproof flexible strip 34 are inserted into the first and second C-shape insertion grooves 311e,321e, respectively, and the flexible sheet 342 is continuously connected to and extended along the entire length of a gap defined between the adjacent first and second frame members 311,321. Meanwhile, the two rigid edge rims 341 have a cross-sectional height greater than that of the flexible sheet 342, so that a water collection recess 340 is defined by the two rigid edge rims 341 and the flexible sheet 342 (as shown in the cross-sectional view of FIG. 9A), wherein the water collection recess 340 faces an outer side of the gap between the adjacent first and second frame members 311,321 in the horizontally extended status. Water collected by the water collection recess 340 or the first and second C-shape insertion grooves 311e,321e can be further drained outward from draining holes (not-shown) formed two ends of the adjacent first and second frame members 311,321.

In the folded status, the first frame member 311 is rotated about 180 degree relative to the second frame member 321, so that the two opposite side surfaces of the adjacent first and second frame members 311,321 formed with the first and second C-shape insertion grooves 311e,321e are not aligned with each other again, while the flexible sheet 342 is bent to be a curved shape and still provides a waterproof effect for the adjacent first and second frame members 311,321.

In addition, as shown in FIGS. 9A-9B, the first embedded body 331 is substantially mostly embedded in the first embedded hole 310 of the first frame member 311, wherein a small portion of the first embedded body 331 is protruded from the side surface of the first frame member 311; Similarly, the second embedded body 332 is substantially mostly embedded in the second embedded hole 320 of the second frame member 321, wherein a small portion of the second embedded body 332 is protruded from the side surface of the second frame member 321.

Figure 10A:
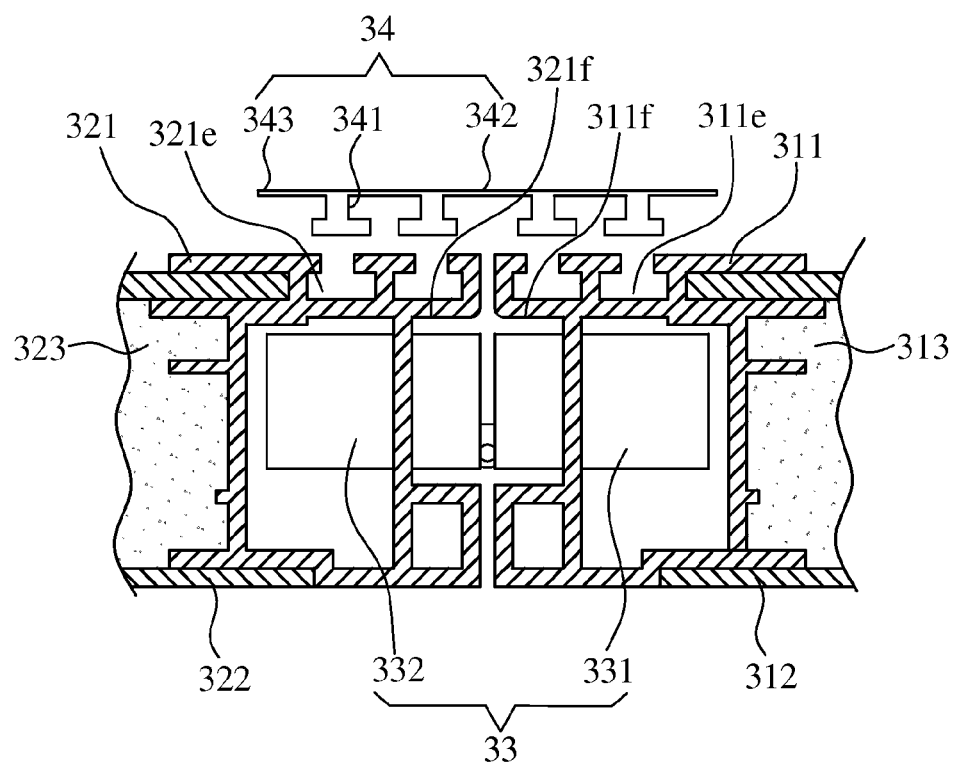
FIG. 10A is an assembled cross-sectional view of installing a waterproof flexible strip onto two adjacent frame members according to a second embodiment of the present invention in a horizontally extended status.
Figure 10B:
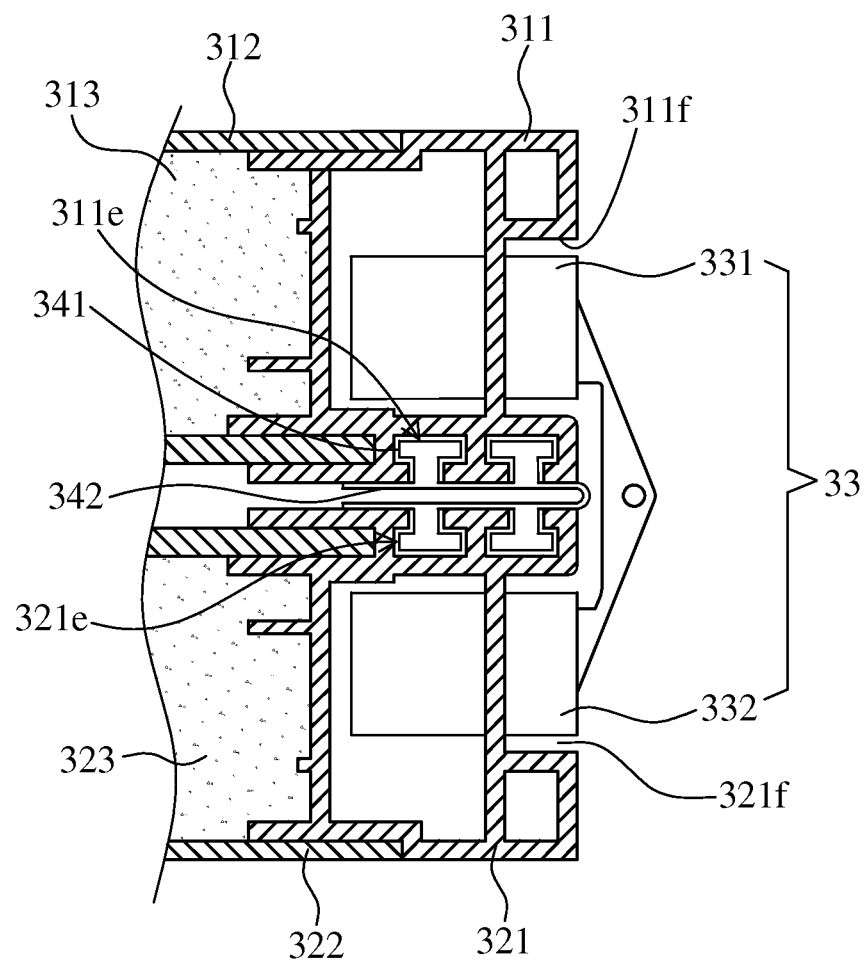
FIG. 10B is an assembled cross-sectional view of installing the waterproof flexible strip onto the two adjacent frame members according to the second embodiment of the present invention in a completely folded status.

Referring now to FIGS. 10A and 10B, assembled cross-sectional views of installing a waterproof flexible strip onto two adjacent frame members according to a second embodiment of the present invention in a horizontally extended status and in a completely folded status are illustrated and similar to FIGS. 9A and 9B of the first embodiment, so that the second embodiment uses similar terms or numerals of the first embodiment. As shown, the difference of the second embodiment is that: the two opposite side surfaces of the adjacent first and second frame members 311,321, the structure of the waterproof flexible strip 34 and the position of the first and second C-shape insertion groove 311e,321e are further modified.

For more details, the two opposite side surfaces of the adjacent first and second frame members 311,321 of the first and second frame sections 31,32 are correspondingly formed with a first recessed groove 311f and a second recessed groove 321f, respectively, and the first and second embedded holes 310,320 are formed within the first and second recessed grooves 311f,321f, respectively, so that a larger front panel portion of the first and second embedded body 331,332 (as shown in FIGS. 6 and 8) can be received in the first and second recessed grooves 311f,321f, respectively, and the first and second embedded holes 310,320 can be a smaller hole for only receiving a smaller rear insertion portion of the first and second embedded body 331,332. Thus, the hole machining of the first and second embedded body 331,332 can be simplified.

Furthermore, an outer surface of the first frame member 311 has at least one first C-shape insertion groove 311e, an outer surface of the second frame member 321 has at least one second C-shape insertion groove 321e, and the at least two rigid edge rims 341 of the waterproof flexible strip 34 are inserted into the first and second C-shape insertion grooves 311e,321e, respectively. Preferably, the outer surface of the first frame member 311 has two of the first C-shape insertion grooves 311e, the outer surface of the second frame member 321 has two of the second C-shape insertion grooves 321e, and four of the rigid edge rims 341 of the waterproof flexible strip 34 are inserted into the two first C-shape insertion grooves 311e and the two second C-shape insertion grooves 321e, respectively. The flexible sheet 342 is further horizontally extended leftward and rightward from the leftmost and rightmost rigid edge rims 341, so as to form an extended portion 343 to cover the first and second C-shape insertion grooves 311e,321e on the outer surface of the first and second frame member 311,321. The two first C-shape insertion grooves 311e and the two second C-shape insertion grooves 321e can be used as a dual water collection recess structure, respectively. Therefore, water collected by two of the dual water collection recess structure (i.e. the first and second C-shape insertion grooves 311e,321e) can be further drained outward from draining holes (not-shown) formed two ends of the adjacent first and second frame members 311,321.

Figure 11A:
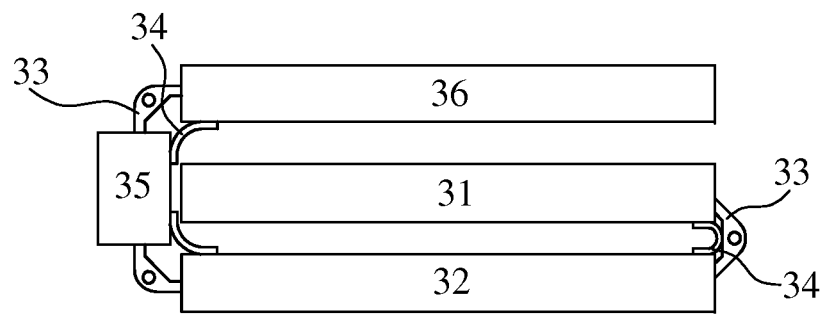
FIG. 11A is a schematic side view of the foldable tonneau cover according to the first or second embodiment of the present invention in a folded status.
Figure 11B:
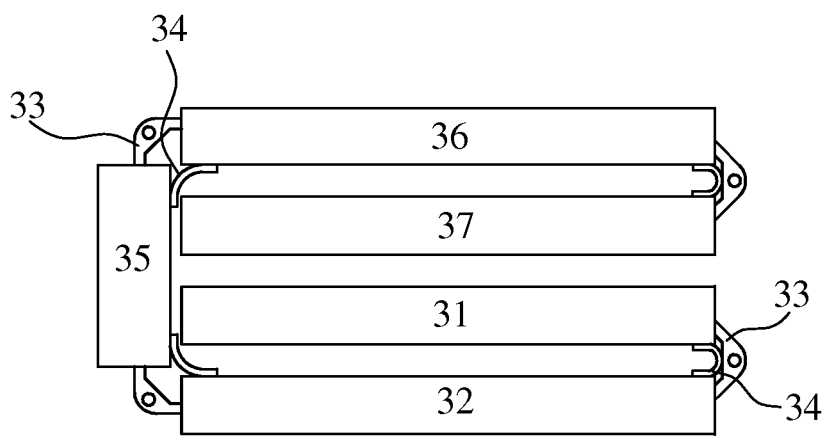
FIG. 11B is another schematic side view of the foldable tonneau cover according to the first or second embodiment of the present invention in a folded status.

Referring now to FIGS. 11A and 11B, schematic side views of two types of the foldable tonneau cover according to the first or second embodiment of the present invention in a folded status are illustrated. As shown in FIG. 11A, the foldable tonneau cover 30 comprises a first frame section 31, a second frame section 32, a spacer frame section 35 and a third frame section 36 in turn, wherein the three frame sections 31,32,36 have substantially identical or similar size; the spacer frame section 35 has a smaller size than the size of each of the frame sections 31,32,36; at least one hidden-type hinge 33 (the number may be one, two or three) and one waterproof flexible strip 34 of the first or second embodiment are installed between any two adjacent frame sections 31,32,35, 36. Because the foldable tonneau cover has the spacer frame section 35, the three frame sections 31,32,36 can be completely folded for storage.

Similarly, as shown in FIG. 11B, the foldable tonneau cover 30 comprises a first frame section 31, a second frame section 32, a spacer frame section 35, a third frame section 36 and a fourth frame section 37 in turn, wherein the four frame sections 31,32,36,37 have substantially identical or similar size; the spacer frame section 35 has a smaller size than the size of each of the frame sections 31,32,36,37; at least one hidden-type hinge 33 and one waterproof flexible strip 34 of the first or second embodiment are installed between any two adjacent frame sections 31,32,35,36,37. Because the foldable tonneau cover has the spacer frame section 35, the four frame sections 31,32,36,37 can be completely folded for storage.

As described above, in comparison with the traditional waterproof foldable tonneau cover, the foldable tonneau cover 30 of the present invention as shown in FIGS. 4 to 9B is provided with at least one hidden-type hinge 33 substantially entirely (or mostly) hidden within frame members 311,321 of two adjacent frame sections 31,32 in an horizontally extended status, so as to minimize the occupied space of the hidden-type hinge 33 and the gap between the adjacent frame sections 31,32. Furthermore, a waterproof flexible strip 34 is provided to be continuously extended along the entire length of the two adjacent frame members 31,32 without being interfered with by the hidden-type hinge 34 substantially entirely (or mostly) hidden within frame members 311,321, so as to enhance the waterproof reliability thereof. The hidden-type hinge 34 and the waterproof flexible strip 34 between any two adjacent frame sections 31,32 is also advantageous to simplify the waterproof interconnection structure between the adjacent frame sections. Moreover, a foam core 313,323 is provided between two rigid cover plates 312,322 of each frame section 31,32, so as to enhance the structural strength and waterproof reliability of the frame section 31,32.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A waterproof flexible strip for a foldable tonneau cover for a pick-up truck, the foldable tonneau cover including a first frame section having a plurality of first frame members, a second frame section having a plurality of second frame members, and at least one hidden-type hinge pivotally connected between two opposite side surfaces of the adjacent first and second frame members, the waterproof flexible strip flexibly connected between the adjacent frame members, disposed outside the hidden-type hinge, and comprising:

at least two rigid edge rims continuously connected to and extended along the entire length of the adjacent first and second frame members; and a flexible sheet integrally and flexibly connected between the at least two rigid edge rims.

2. The waterproof flexible strip according to claim 1, wherein the at least two rigid edge rims are made of a first plastic material, the flexible sheet is made of a second plastic material, and the first plastic material has a stiffness greater than that of the second plastic material.

3. The waterproof flexible strip according to claim 1, wherein the opposite side surfaces of the adjacent first and second frame members have a first C-shape insertion groove and a second C-shape insertion groove, respectively, and two of the rigid edge rims of the waterproof flexible strip are inserted into the first and second C-shape insertion grooves, respectively.

4. The waterproof flexible strip according to claim 1, wherein the at least two rigid edge rims have a cross-sectional height greater than that of the flexible sheet, so that a water collection recess is defined by the at least two rigid edge rims and the flexible sheet, wherein the water collection recess faces an outer side of a gap defined between the adjacent first and second frame members in a horizontally extended status of the adjacent first and second frame members.

5. The waterproof flexible strip according to claim 1, wherein an outer surface of the first frame member has at least one first C-shape insertion groove, an outer surface of the second frame member has at least one second C-shape insertion groove, and the at least two rigid edge rims of the waterproof flexible strip are inserted into the first and second C-shape insertion grooves, respectively.

6. The waterproof flexible strip according to claim 5, wherein the outer surface of the first frame member has two of the first C-shape insertion grooves, the outer surface of the second frame member has two of the second C-shape insertion grooves, and four of the rigid edge rims of the waterproof flexible strip are inserted into the two first C-shape insertion grooves and the two second C-shape insertion grooves, respectively.

* * * * *